(12) United States Patent
O'Donnell

(10) Patent No.: US 10,179,624 B1
(45) Date of Patent: Jan. 15, 2019

(54) GOLF TRIKE

(71) Applicant: Edward O'Donnell, Hollywood, FL (US)

(72) Inventor: Edward O'Donnell, Hollywood, FL (US)

(*) Notice: Subject to any disclaimer, the term of this patent is extended or adjusted under 35 U.S.C. 154(b) by 0 days.

(21) Appl. No.: 16/114,400

(22) Filed: Aug. 28, 2018

(51) Int. Cl.
  *B62K 13/04* (2006.01)
  *B62K 13/02* (2006.01)
  *A63B 55/60* (2015.01)
  *B62J 11/00* (2006.01)
  *B62K 5/02* (2013.01)
  *B62K 5/00* (2013.01)

(52) U.S. Cl.
  CPC .......... *B62K 13/025* (2013.01); *A63B 55/60* (2015.10); *B62J 11/00* (2013.01); *B62K 5/02* (2013.01); *B62K 13/04* (2013.01); *B62K 2005/002* (2013.01)

(58) Field of Classification Search
  CPC .. B62K 13/025; B62K 5/02; B62K 2005/002; B62K 13/04; A63B 55/60; B62J 11/00
  See application file for complete search history.

(56) References Cited

U.S. PATENT DOCUMENTS

| | | | |
|---|---|---|---|
| 2,962,106 A | 11/1960 | Burnside | |
| 3,043,389 A | 7/1962 | Steinberg | |
| 3,304,036 A | 2/1967 | Davis | |
| 3,354,975 A | 11/1967 | Stuart | |
| 3,369,629 A | 2/1968 | Morris | |
| 3,580,349 A | 5/1971 | Brennan | |
| 3,605,929 A | 9/1971 | Rolland | |
| 3,713,502 A | 1/1973 | Delaney | |
| 4,431,205 A | 2/1984 | Speicher | |
| 4,538,695 A * | 9/1985 | Bradt | B60L 11/1805 180/19.2 |
| 4,573,549 A | 3/1986 | Pankow | |
| 4,848,504 A | 7/1989 | Olson | |
| 4,874,055 A | 10/1989 | Beer | |
| 5,265,695 A | 11/1993 | Piazzi | |
| 5,312,126 A | 5/1994 | Shortt | |
| 5,328,193 A * | 7/1994 | Shiew | B62K 3/002 280/62 |
| 5,346,028 A | 9/1994 | Cassano | |
| 5,788,255 A | 8/1998 | Hayes | |
| 6,390,216 B1 | 5/2002 | Sueshige | |
| 6,715,774 B2 | 4/2004 | Cassoni | |
| 7,293,619 B2 | 11/2007 | Mitchell, Jr. | |
| 7,322,434 B1 * | 1/2008 | Hussain | B62H 1/12 180/180 |

(Continued)

FOREIGN PATENT DOCUMENTS

WO  WO 2007/090285  8/2007

*Primary Examiner* — Tony H Winner
*Assistant Examiner* — Marlon A Arce
(74) *Attorney, Agent, or Firm* — Christopher J. Vandam, PA; Chris Van Dam

(57) ABSTRACT

A golf trike that has a slot between two storage compartments between its rear wheels. The slot fits and holds the front tire of a towed golf trike. A bag rack on the front golf trike articulates forward out of the way of the slot on the front trike to allow the front tire of the rear trike to fit into the slot. When the golf trike is not towing another trike the bag rack articulates rearward to hold a golf bag for routine play.

4 Claims, 3 Drawing Sheets

(56) References Cited

U.S. PATENT DOCUMENTS

| | | | | |
|---|---|---|---|---|
| 7,631,715 | B2* | 12/2009 | Falkiner | B62K 5/027 |
| | | | | 180/210 |
| 7,658,252 | B2 | 2/2010 | Shapiro | |
| 9,284,013 | B2* | 3/2016 | Rim | B62K 25/04 |
| 9,550,540 | B1* | 1/2017 | Wang | B62J 11/00 |
| 2011/0198822 | A1* | 8/2011 | Jessie, Jr. | B62K 9/00 |
| | | | | 280/278 |

* cited by examiner

GOLF TRIKE

BACKGROUND OF THE INVENTION

1. Field of the Invention

The present invention relates to the sport of golf, and more particularly, to a trike used with the game that can be connected with another copy of the trike for movement together.

2. Description of the Related Art

Several designs for three wheeled golf carts have been designed in the past. None of them, however, includes a convenient way to connect one to another in a towing configuration while providing ample space and adapted features to also carry golf equipment and supplies while in a singular mode.

Applicant believes that the closest reference corresponds to U.S. Pat. No. 3,369,629 issued to Weiss. However, it differs from the present invention because the Weiss device does not include a slot in the rear of the three wheel cart where multiple copies of the cart can be linked to tow together. The Weiss device does include a foldable feature but does so for compactness and not for assembling several carts linked into a train for simultaneous transport. The Weiss device does not include nor suggest a slot to hold the front wheel of another cart.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a golf trike that is adapted for a single rider to carry a golf bag to and on a golf course.

It is another object of this invention to provide a golf trike that has a folding golf cart rack that articulates forward to expose a slot for a wheel of a trailing golf trike in tow.

It is still another object of the present invention to provide a golf trike that links to other similar golf trikes so that a single driver in the front trike can tow several trikes behind easily when managing the golf trikes.

Another object of golf trike is to provide optional adaptations useful for a golf game including any of onboard storage, a built in cooler, a seat rest, an overhead umbrella, pedal drive and motorized drive means.

Another object of the present invention is to provide a golf trike that provides the operator a means of modest exercise on the golf course while playing a round while also carrying essential golf supplies and convenience accessories.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
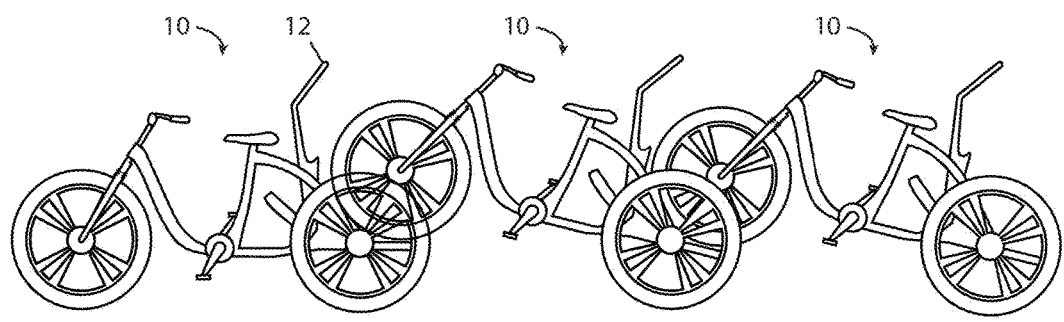
FIG. 1 a side elevation view of three copies of a golf trike linked together in a transport mode.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the trike, the golf trike, the cart, the vehicle, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a rack 12, a slot 14, storage 16, storage 18, a frame 20, a wheel 22, a wheel 24, a wheel 26, a seat, 28, pedals 30, handlebars 32, a hinge 34, a hinge 36, a lid 38, a rest 40, a golf bag 42, a carrier assembly 44, a support 46, a backrest 48 and an umbrella 50.

Figure 5:
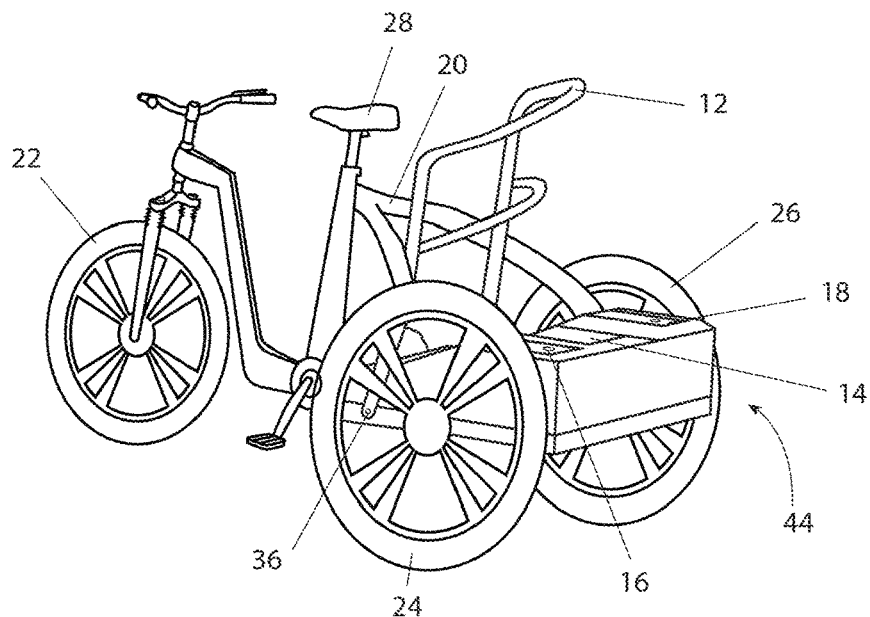
FIG. 5 shows a perspective view of a golf trike in a transport mode without a golf bag.

Looking at FIGS. 1 and 5 in combination, an important feature of the golf trike is demonstrated. Without a golf bag 42 placed onto the golf trike the rack 12 can be articulated forward. This exposes the slot 14 on the carrier assembly 44 so that a front wheel 22 of another copy of the golf trike can be inserted into the slot 14 and several golf trikes can be connected or linked together for movement together. In this transport mode, a rider on the front golf trike can pedal or otherwise power the front golf trike and all the others linked behind can move together.

Figure 2:
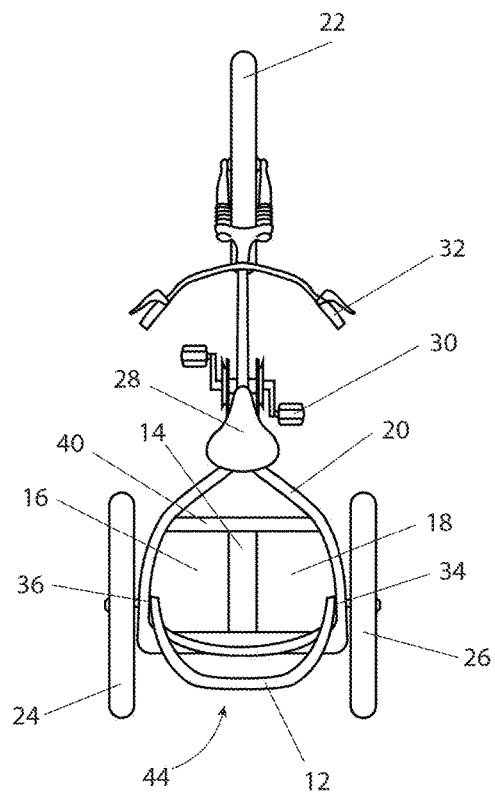
FIG. 2 shows a top plan view of a golf trike in a use mode without a golf bag.

FIG. 2 is a top side plan view of a golf trike that shows the three wheels 22, 24 and 26 in a traditional three wheeled, trike configuration connected by the frame 20. The frame 20 also supports a seat 28 above a set of pedals 30 operatively connected to the rear wheels 24 and 26 to provide a motive force to the trike. Steering of the golf trike is provided by the handle bars 32 linked to the front wheel 22.

The frame 20 spans between the rear wheels 24 and 26 and provides a structure onto which the carrier assembly 44 is affixed. On either left and right side of the carrier assembly 44 and outboard of the front tire carrying slot 14 are a storage 16 and a storage 18. The storage 16 and 18 may be configured and adapted for items useful for the game of golf and other accessories.

For example, the storage 16 and/or storage 18 may be insulated to perform as cooler to keep cold drinks and food cold as needed or may also be used to keep warmed food warmed for consumption during the course of play. There may be a lid 38 on either or both of the storage 16 and storage 18. The lid 38 may be lockable with a key, combination or other type of lock.

The lid 38 may also be adapted for use as a cooler by being fabricated of an insulated material such as a foam core sandwiched between laminated layers. Cup holders or other trays may also be molded into or otherwise formed into the lid 38. The lid(s) 38 may be hinged to the storage 36 or 38. Alternatively, the lid(s) 38 may be removable to expose the storage 36 or 38 below.

The storage 36 and 38 may also be adapted to use for golf-specific utility by including a golf tee caddy or golf ball caddy. In one version of the golf trike either the storage 36 or 38 may be used to hold a soil and or seed combination to repair divots and ruts made into the course that happen incidentally with the game of golf.

Figure 3:
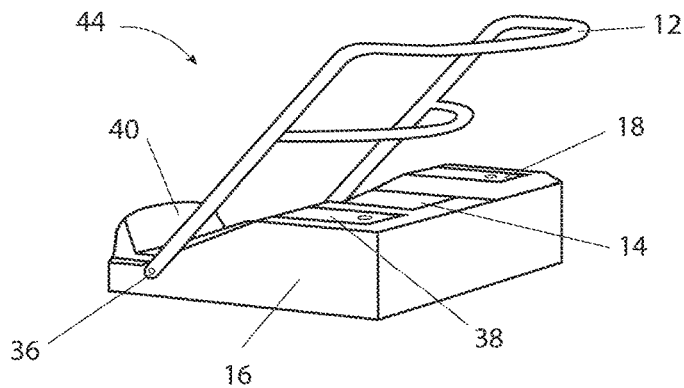
FIG. 3 shows a perspective view of a carrier assembly separated from the balance of a golf trike.

The rack 12 is angled when in the golf bag 42 carrying mode as seen in FIG. 3. The rack 12 is angled aft and curved to allow the operator's golf bag 42 to nestle into the rack 12. A strap is optional to hold the golf bag 42 onto the rack 12 but is generally not needed due to the geometry of the rack 12 utilizing gravity to hold the golf bag 42 in place.

A rest 40 may be provided at the front of the carrier assembly 44 that the bottom of the golf bag 42 may rest upon while it is in the rack 12. The rest 40 prevents the golf bag 42 from sliding too far forward. The part of the frame 20 supporting the seat 28 may also aid in keeping the golf bag 42 in proper position on the rack 12. The rest 40 may be integrated into the carrier assembly 44 as seen in FIG. 3 or it may be a part of the frame 20 of the golf trike.

The rack 12 connects to either the carrier assembly 44 as seen in FIG. 3 or alternatively attach to the frame 20 of the golf trike. A hinge 36 and hinge 34 are provided on either side of the golf trike about which the rack 12 can articulate.

Figure 4:
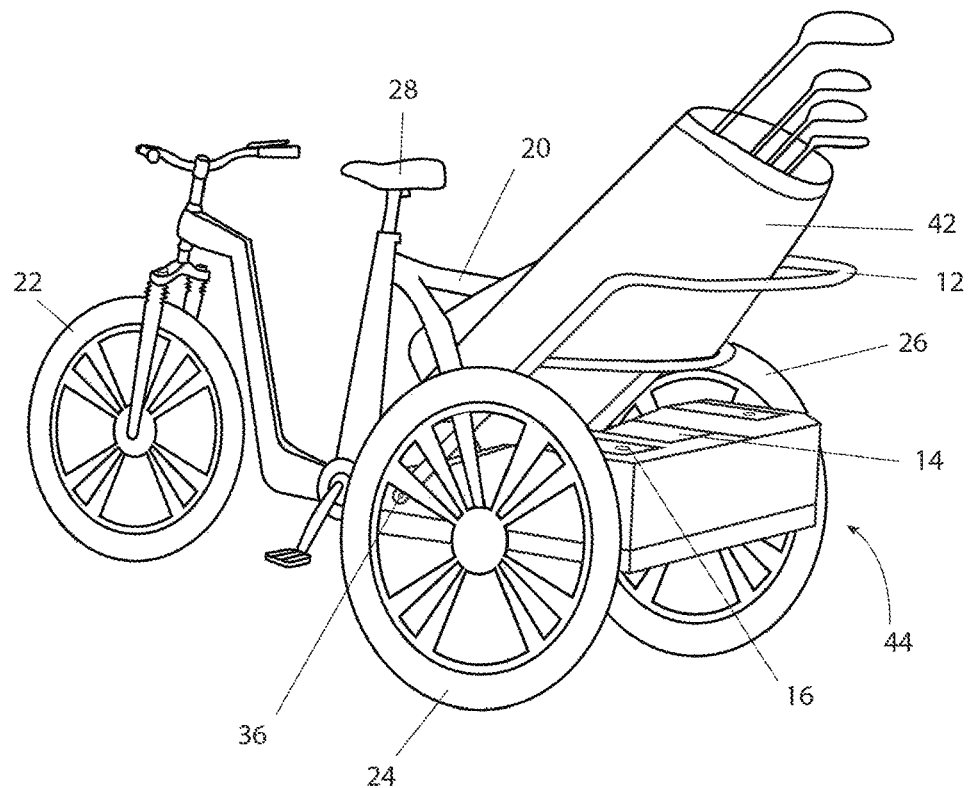
FIG. 4 shows a perspective view of a golf trike carrying a golf bag.

In either version, the rack 12 articulates from a rear position where it can carry a golf bag 42 as seen in FIG. 4 or articulates to a forward position, seen in FIGS. 1 and 5 where the slot 14 on the carrier assembly 44 is exposed to accept a front tire 22 of another trike in a linked configuration for transporting several trikes connected together.

The golf trike may be entirely pedal powered by the operator. In this way a little exercise is added to a typical game of golf. Alternatively, a battery or fuel operated motor may entirely power or may supplement human pedal power. A motor and energy source may be attached to the frame 20 or to the carrier assembly 44 and connected to one or more of the wheels 22, 24 and/or 26.

In one version of the golf trike a battery is contained in or connected onto the frame 20. An electric motor, such as a hub motor may be configured within the wheel 22. One of the other wheels 24 or 26 could have hub motor in addition to or in substitution for a hub motor in the wheel 22. A solar photo-voltaic may be located on a lid 38 or as part of the shade umbrella 50.

Other types of motors such as gasoline or propane powered motors could also be used to provide motive power to the golf trike. Such a motor could be integrated with the carrier assembly 44 or mounted elsewhere on the golf trike. Controls for power auxiliary to human pedal power could be controlled on the handle bars 32.

Figure 6:
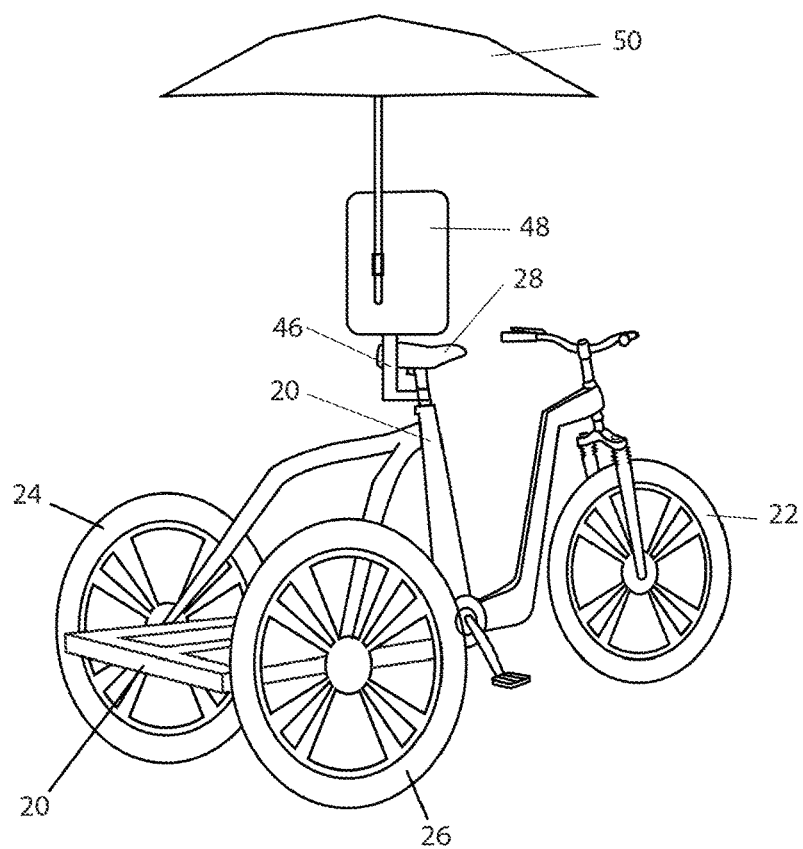
FIG. 6 shows a perspective view of a golf trike with optional accessories and without a carrier assembly attached.

As demonstrated in FIG. 6, the golf trike may optionally include a backrest 48 connected to the frame 20 or seat 28 to provide more comfort to the operator of the golf trike during movement and while at rest sitting on the golf trike. An umbrella 50 may also optionally be provided to provide protection to the rider from both sun and rain.

Each of the tires on the wheels 22, 24 and 26 may be adapted to softer soil, grass and other surfaces that may be encountered on a golf course. For example, low pressure fat 'balloon' may resist sinking into the soil which can make the trike difficult to pedal and can also damage the turf of the course by digging in, especially in softer or wet ground.

An important version of the invention can be fairly described as a first golf trike comprised of a three wheeled vehicle having a steerable front wheel and a separated pair of rear wheels, each connected to a frame so that the golf trike can roll and be powered by a rider pedaling. A seat is disposed between the front wheel and the pair of rear wheels and is connected to the frame that the rider can sit upon. A first storage container and a second storage container are affixed to the frame between the rear wheels. A slot is disposed between the first storage container and the second storage container that is dimensioned to fit the front wheel of a second towed trike and adapted to hold off of a ground surface a front wheel of a towed golf trike so that the two trikes a linked like a train as seen in FIG. 1. A bag rack that on a lower end is articulably affixed to the first golf trike that on when in a forward position the bag rack does not obstruct a front wheel of the towed golf trike from engaging into the slot as seen in FIGS. 1 and 5 and only when in a rear position the bag rack is configured to support a golf bag as seen in FIGS. 2, 3 and 4. The first golf trike tows the towed golf trike when the front wheel of the towed golf trike is in the slot of the first golf trike as seen in FIG. 1.

Variations of the golf trike can further include a pedal driven propulsion means is operatively connected to a rear wheel as seen in FIG. 4. The golf trike may also include a motor or engine propulsion means is also operatively connected to a wheel. This could be any of, or any combination of, the three wheels. The golf trike may also include an umbrella is supported above the seat and/or a seat back rest attached near the seat.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A first golf hike comprised of a three wheeled vehicle having a steerable front wheel and a separated pair of rear wheels, each connected to a frame;
   a seat is disposed between the front wheel and the pair of rear wheels and is connected to the frame;
   a first storage container and a second storage container are affixed to the frame between the rear wheels;
   a slot is disposed between the first storage container and the second storage container that is dimensioned to fit and adapted to hold off of a ground surface a front wheel of a towed golf trike;
   a bag rack that on a lower end is articulably affixed to the first golf trike that on when in a forward position the bag rack does not obstruct a front wheel of the towed golf trike from engaging into the slot and only when in a rear position the bag rack is configured to support a golf bag;
   the first golf trike tows the towed golf trike when the front wheel of the towed golf trike is in the slot of the first golf trike.

2. The first golf trike in claim 1 further characterized in that a pedal driven propulsion means is operatively connected to a rear wheel.

3. The first golf trike in claim 2 further characterized in that a motor or engine propulsion means is also operatively connected to a wheel.

4. The first golf trike in claim 1 further characterized in that an umbrella is supported above the seat.

* * * * *